(12) United States Patent
Mimura

(10) Patent No.: US 6,971,088 B1
(45) Date of Patent: Nov. 29, 2005

(54) SCENARIO ANALYSIS CONTROL SYSTEM DEVICE

(75) Inventor: Takayuki Mimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 518 days.

(21) Appl. No.: 09/714,267

(22) Filed: Nov. 17, 2000

(30) Foreign Application Priority Data

Aug. 31, 2000 (JP) .............................. 2000-263942

(51) Int. Cl.[7] .............................................. G06F 9/44
(52) U.S. Cl. ...................... 717/127; 717/128; 717/129; 717/131; 714/38
(58) Field of Search ................................ 717/106, 120, 717/124–135; 709/103, 104, 102; 714/38

(56) References Cited

U.S. PATENT DOCUMENTS

| | | | |
|---|---|---|---|
| 4,429,368 A | * | 1/1984 | Kurii ............................ 714/38 |
| 4,562,436 A | * | 12/1985 | Coleman et al. ............. 340/825 |
| 4,604,694 A | * | 8/1986 | Hough ........................ 710/200 |
| 4,692,858 A | * | 9/1987 | Redford et al. .............. 345/744 |
| 5,247,651 A | * | 9/1993 | Clarisse ......................... 703/13 |
| 5,511,167 A | * | 4/1996 | Kawano et al. .............. 709/202 |
| 5,581,691 A | * | 12/1996 | Hsu et al. ....................... 714/15 |
| 5,687,074 A | * | 11/1997 | Tanaka et al. ................ 700/26 |
| 5,812,133 A | * | 9/1998 | Schultz et al. .............. 345/809 |
| 6,243,092 B1 | * | 6/2001 | Okita et al. .................. 345/866 |

* cited by examiner

*Primary Examiner*—Tuan Dam
*Assistant Examiner*—Chuck Kendall
(74) *Attorney, Agent, or Firm*—Leydig, Voit & Mayer, Ltd.

(57) ABSTRACT

A scenario analysis control system device includes a start-up reception unit for accepting a periodic start-up, and a scenario storage unit for storing two or more text scenarios, each of which implements a specific function and includes control codes. A priority level definition storage unit stores a priority level and a number of steps executable in response to a single start-up, provided for each of the two or more text scenarios stored in the scenario storage unit. Every time the start-up reception unit accepts a start-up, a scenario analysis processing unit determines which text scenario is to be executed next and which one or more steps of one selected text scenario are to be executed according to the priority levels respectively assigned to the two or more text scenarios. The scenario analysis processing unit then reads a determined number of steps of the selected text scenario from the scenario storage unit and executes them.

14 Claims, 9 Drawing Sheets

SCENARIO ANALYSIS CONTROL SYSTEM DEVICE

BACKGROUND OF THE INVENTION

1. Field of the Invention

The present invention relates to a scenario analysis control system device that dynamically analyzes text control scenario comprised of control codes, converts the text control scenario into a statement written in machine language code by code, and executes the statement so as to control an object to be controlled.

2. Description of the Prior Art

FIG. 11 is an explanatory drawing showing a prior art text type control scenario. The prior art scenario analysis type control system devices deciphers each step of a text type control scenario comprised of control codes, which a user made, under batch control, converts the text type control scenario into a statement written in a machine language, and executes the statement so as to control an object to be controlled.

Thus, since the prior art scenario analysis type control system device simply executes one text type control scenario step by step, the prior art scenario analysis type control system device cannot accept a control event specific to the control system. Furthermore, the prior art scenario analysis type control system device cannot implement a pseudomultitasking environment in which it can execute two or more text type scenarios by switching between these text type control scenarios.

In addition, in the prior art scenario analysis type control system device, a storage unit for storing one text type control scenario and another storage unit for storing dynamic data generated at the time of execution of the text type control scenario are not separated from each other. Therefore, when replacing the text type control scenario being executed with another text type control scenario, the prior art scenario analysis type control system device has to do so and execute it after suspending the current execution of the text type control scenario to prevent the dynamic data from disappearing. And, when switching back to the text type control scenario, the prior art scenario analysis type control system device has to execute it from the ground up. Thus, the prior art scenario analysis type control system device is not able to perform an online replacement.

Furthermore, the prior art scenario analysis type control system device cannot exclusively perform execution of any step other than fixed steps of the text type control scenarios.

A problem with a prior art scenario analysis type control system device constructed as above is that it cannot perform an acceptance of any control event, pseudomultitasking, an online replacement, and an exclusive operation, and therefore this results in inconvenience for users.

SUMMARY OF THE INVENTION

The present invention is proposed to solve the above-mentioned problems. It is therefore an object to provide a scenario analysis type control system device that can perform an acceptance of any control event, pseudomultitasking, an online replacement, and an exclusive operation.

In accordance with an aspect of the present invention, there is provided a scenario analysis type control system device comprising: a start-up reception unit for accepting a periodic start-up; a scenario storage unit for storing two or more text type scenarios each of which implements a specific function and is comprised of control codes; a priority level definition storage unit for storing a priority level and a number of steps executable by one start-up, which are provided for each of the two or more text type scenarios stored in the scenario storage unit; and a scenario analysis processing unit for, every time the start-up reception unit accepts a start-up, determining which text type scenario is to be executed next and which one or more steps of one selected text type scenario are to be executed according to priority levels stored in the priority level definition storage unit, and for reading the determined number of steps of the selected text type scenario from the scenario storage unit and executing them.

In accordance with another aspect of the present invention, there is provided a scenario analysis type control system device comprising: a start-up reception unit for accepting a start-up from an external program; a scenario storage unit for storing two or more text type scenarios each of which implements a specific function and is comprised of control codes; a priority level definition storage unit for storing a priority level and a number of steps executable by one start-up from the external program, which are provided for each of the two or more text type scenarios stored in the scenario storage unit; an event definition storage unit for storing processing type information indicating processing to be performed on external data and scenario identification information indicating one text type scenario that is to be executed and is stored in the scenario storage unit, which are provided for each of two or more event identifiers; and a scenario analysis processing unit for, every time the external program start-up reception unit accepts a start-up from the external program, determining which text type scenario is to be executed next and which one or more steps of one selected text type scenario are to be executed according to priority levels stored in the priority level definition storage unit, for reading the determined number of steps of the selected text type scenario from the scenario storage unit and executing them, for, when an event identifier and external data are input from the external program, retrieving processing type information and scenario identification information corresponding to the event identifier from the event definition storage unit, for processing the external data according to the processing type information, and for reading one text type scenario to be executed from the scenario storage unit according to the scenario identification information and executing the text type scenario.

In accordance with a further aspect of the present invention, the scenario analysis processing unit generates a source program based on the executed text type scenario and data generated by the execution of the text type scenario.

In accordance with another aspect of the present invention, the scenario analysis type control system device further comprises a scenario execution trace storage unit for storing exclusive execution information for prohibiting execution of any other steps for each of the two or more text type scenarios stored in the scenario storage unit. Furthermore, the scenario analysis processing unit updates corresponding exclusive execution information stored in the scenario execution trace storage unit according to either an exclusive demand or an exclusive release demand included in a control code executed of the text type scenario, and prohibits execution of any other steps while the corresponding exclusive information indicates an input of an exclusive demand.

In accordance with a further aspect of the present invention, the scenario analysis type control system device further comprises a scenario execution trace storage unit for storing one or more break points for interrupting execution of a corresponding text type scenario for each of the two or more text type scenarios stored in the scenario storage unit. Furthermore, when one or more break points are included in a control code executed of the text type scenario or when receiving a break point release demand, the scenario analysis processing unit writes the one or more break points into the scenario execution trace storage unit or deletes all existing break points for the text type scenario from the scenario execution trace storage unit, and interrupts the execution of the text type scenario while the one or more break points are being written in the scenario execution trace storage unit.

In accordance with another aspect of the present invention, the scenario analysis type control system device further comprises a scenario execution trace storage unit for storing step execution information for instructing the scenario analysis processing unit to execute a corresponding text type scenario step by step for each of the two or more text type scenarios stored in the scenario storage unit. Furthermore, when a step execution instruction is included in a control code executed of the text type scenario or when receiving a step execution release demand, the scenario analysis processing unit updates corresponding step execution information stored in the scenario execution trace storage unit, and performs the execution of the text type scenario step by step while the corresponding step execution information indicates an input of the step execution instruction.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
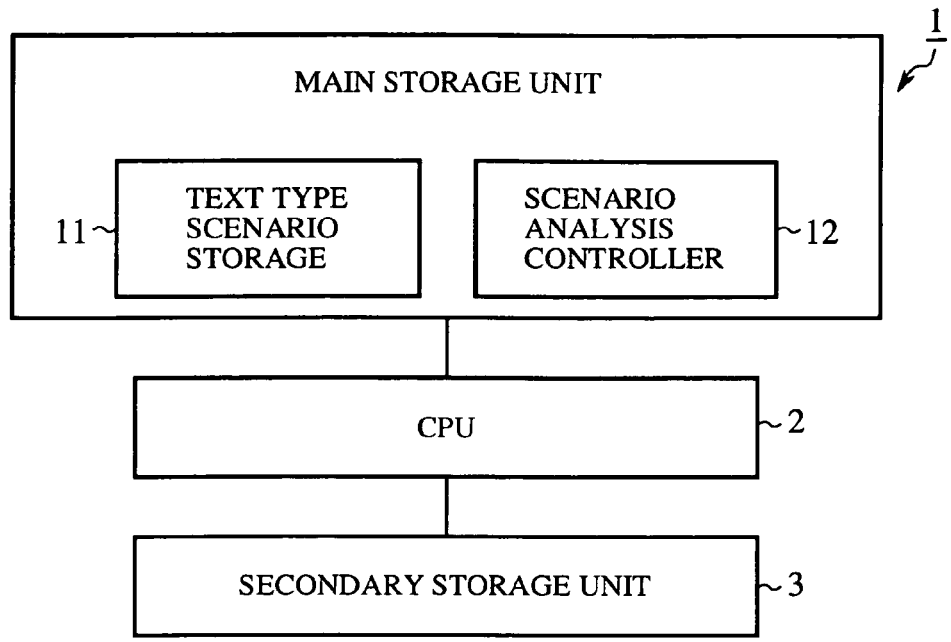
FIG. 1 is a block diagram showing a scenario analysis type control system device according to a first embodiment of the present invention.

FIG. 1 is a block diagram showing a scenario analysis type control system device according to a first embodiment of the present invention. In the figure, reference numeral 1 denotes a main storage unit, numeral 2 denotes a CPU, and numeral 3 denotes a secondary storage unit such as a magnetic disk. The main storage unit 1 includes a text type scenario storage 11, and a scenario analysis controller 12.

Figure 2:
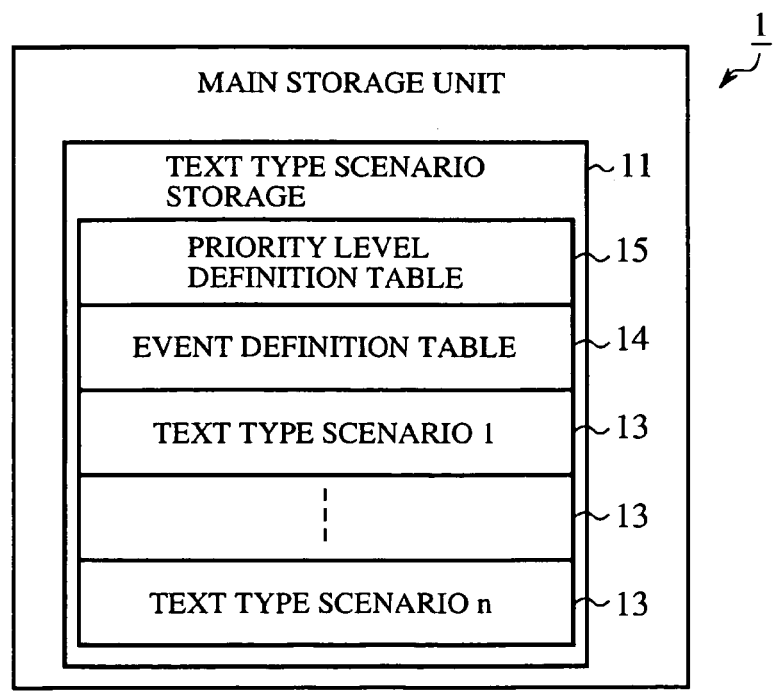
FIG. 2 is an explanatory drawing showing a text scenario storage unit of the scenario analysis control system device according to the first embodiment in detail.

FIG. 2 is an explanatory drawing showing the text type scenario storage in detail. In the figure, reference numeral 0.13 denotes each of two or more text type scenarios which are provided for two or more different functions, respectively, numeral 14 denotes an event definition table for storing key information defined to make it possible for the scenario analysis type control system device to perform processing easily when an external or internal factor triggers the scenario analysis type control system device to start control, and numeral 15 denotes a priority level definition table for storing priorities respectively assigned to a plurality of text type scenarios 13.

Figure 3:
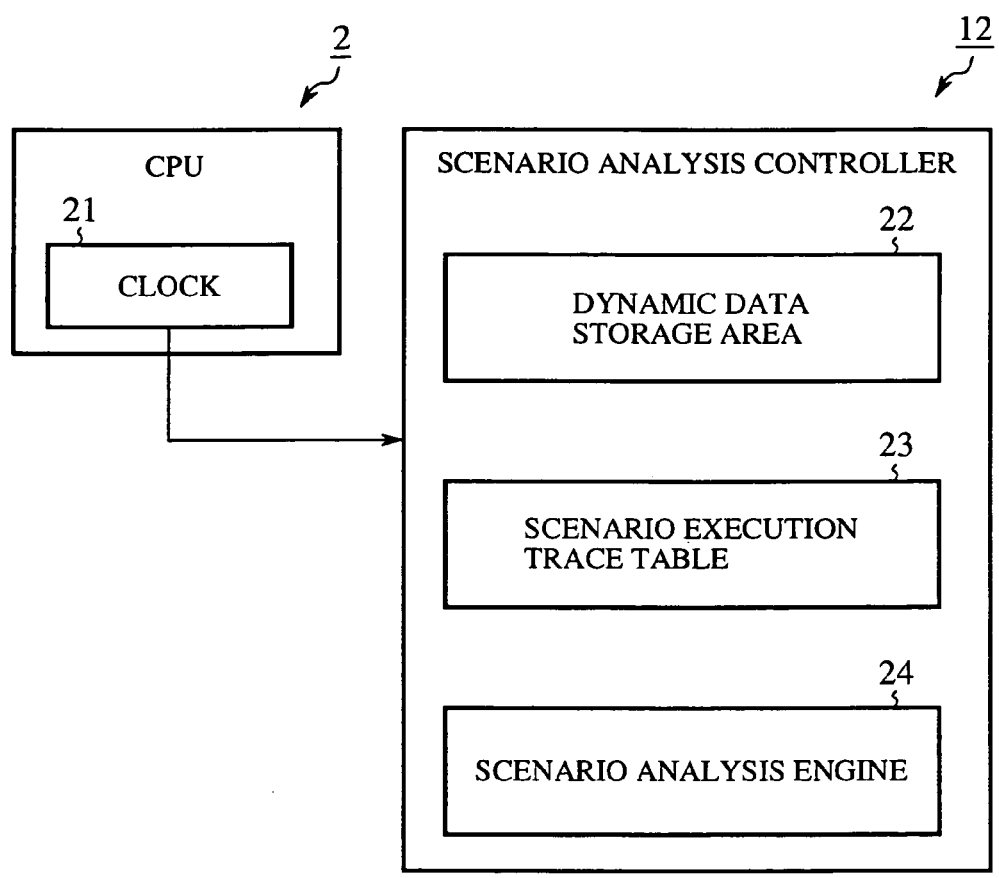
FIG. 3 is an explanatory drawing showing a CPU and a scenario analysis controller of the scenario analysis control system device according to the first embodiment in detail.

FIG. 3 is an explanatory drawing showing the CPU 2 and the scenario analysis controller 12 in detail. In the figure, reference numeral 21 denotes a clock disposed in the CPU 2, for generating a timed pulse to start the scenario analysis controller 12 at predetermined intervals. Furthermore, in the scenario analysis controller 12, reference numeral 22 denotes a dynamic data storage area for storing data that appears or disappears when the scenario analysis controller 12 performs a control processing, numeral 23 denotes a scenario execution trace table used for the scenario analysis controller 12 to trace execution, and numeral 24 denotes a scenario analysis engine for analyzing one text type scenario 13 to be executed, and for actually executing the text type scenario 13 according to the analysis result.

Figure 4:
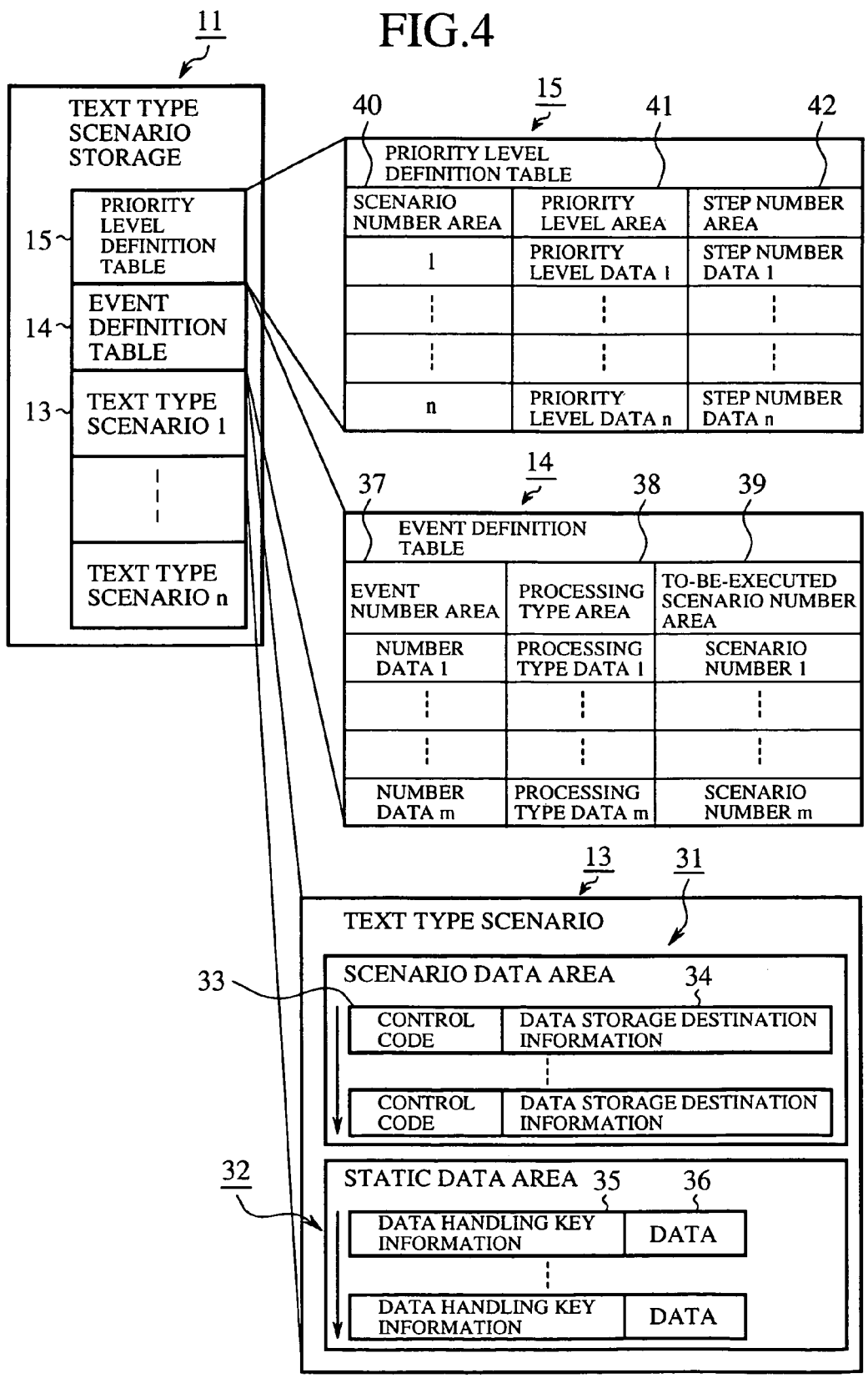
FIG. 4 is an explanatory drawing showing in detail various tables stored in the text type scenario storage unit in detail

FIG. 4 is an explanatory drawing showing various tables stored in the text type scenario storage 11 in detail. In each text type scenario 13, reference numeral 31 denotes a scenario data area, and numeral 32 denotes a static data area. Furthermore, in the scenario data area 31, reference numeral 33 denotes a control code that can be analyzed with the scenario analysis engine 24 and that is described in the text format, and numeral 34 denotes data storage destination information describing a label indicating a destination where a data constellation output from the scenario analysis engine 24 is stored in the dynamic data storage area 22 when the CPU executes the corresponding control code 33. The data storage destination information 34 is the one which makes it possible for other control codes to refer to the data constellation. In addition, in the static data area 32, reference numeral 35 denotes data handling key information describing label key information to be used by a control code 33, and numeral 36 denotes data for describing information indicated directly or indirectly by the label key information. Thus, each text type scenario 13 is comprised of the scenario data area 31 where the control logic is described with a description method, such as a high order language, used when the user makes a program, and the static data area 32 where various parameters intended to be used for the control logic are defined.

In the event definition table 14, reference numeral 37 denotes an event number area for storing an event number defined as key information for indicating a process of transferring external data between the scenario analysis controller and an external program, which will be described later in Embodiment 2, numeral 38 denotes a processing type area for storing processing type data describing in a code the process of transferring external data between the scenario analysis controller and the external program, each processing type data being associated with a corresponding event number, and numeral 39 denotes a to-be-executed scenario number area for storing a scenario number identifying one text type scenario 13 to be executed, each scenario number being associated with a corresponding event number.

In the priority level definition table 15, reference numeral 40 denotes a scenario number area for storing a scenario number assigned to each text type scenario 13, numeral 41 denotes a priority level area for storing a priority level showing the order in which each text type scenario 13 is to be executed, which is preset according to the contents of each text type scenario, and numeral 42 denotes a step number area for storing a number of steps of each text type scenario 13 that are executable by a start-up of the scenario analysis engine 24.

Figure 5:
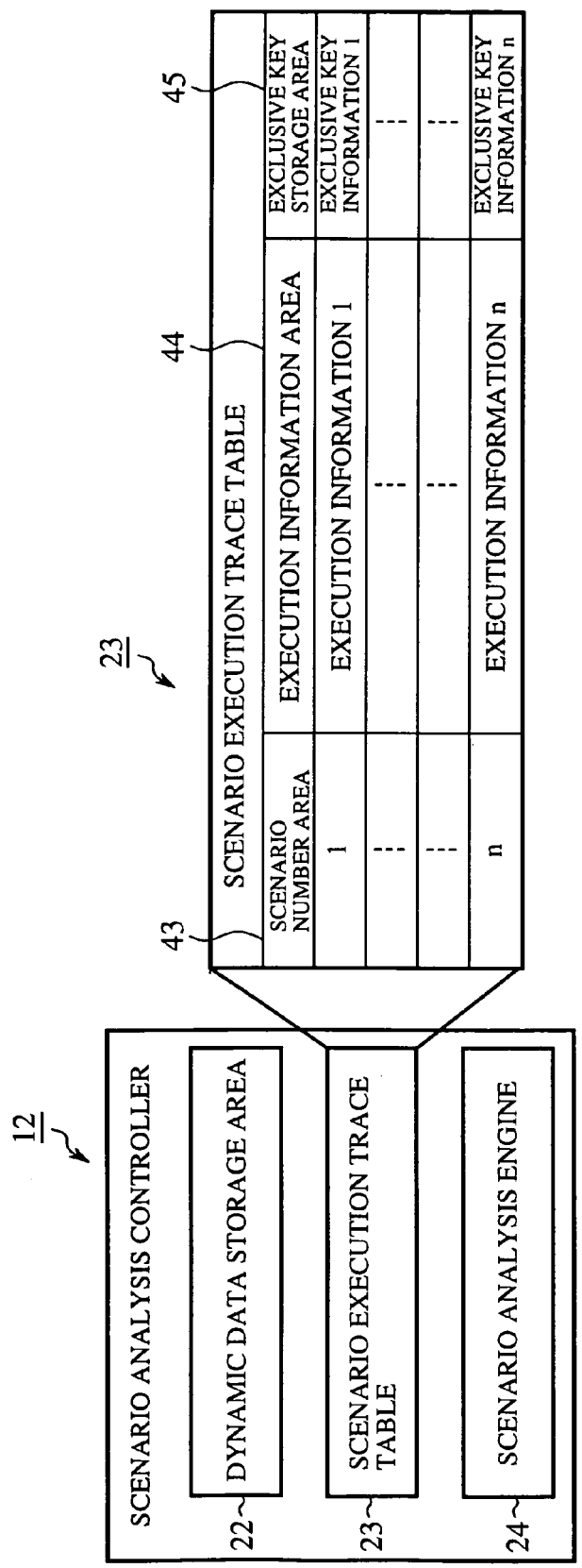
FIG. 5 is an explanatory drawing showing in detail a scenario execution trace table of the scenario analysis controller

FIG. 5 is a diagram showing the structure of the scenario execution trace table in detail. In the figure, reference numeral 43 denotes a scenario number area for storing the scenario number assigned to each text type scenario 13, numeral 44 denotes an execution information area for storing execution information about the most-recently-executed step of each text type scenario 13, and numeral 45 denotes an exclusive key storage area in which exclusive key information corresponding to one text type scenario to be executed is stored to prohibit execution of any other steps.

Figure 6:
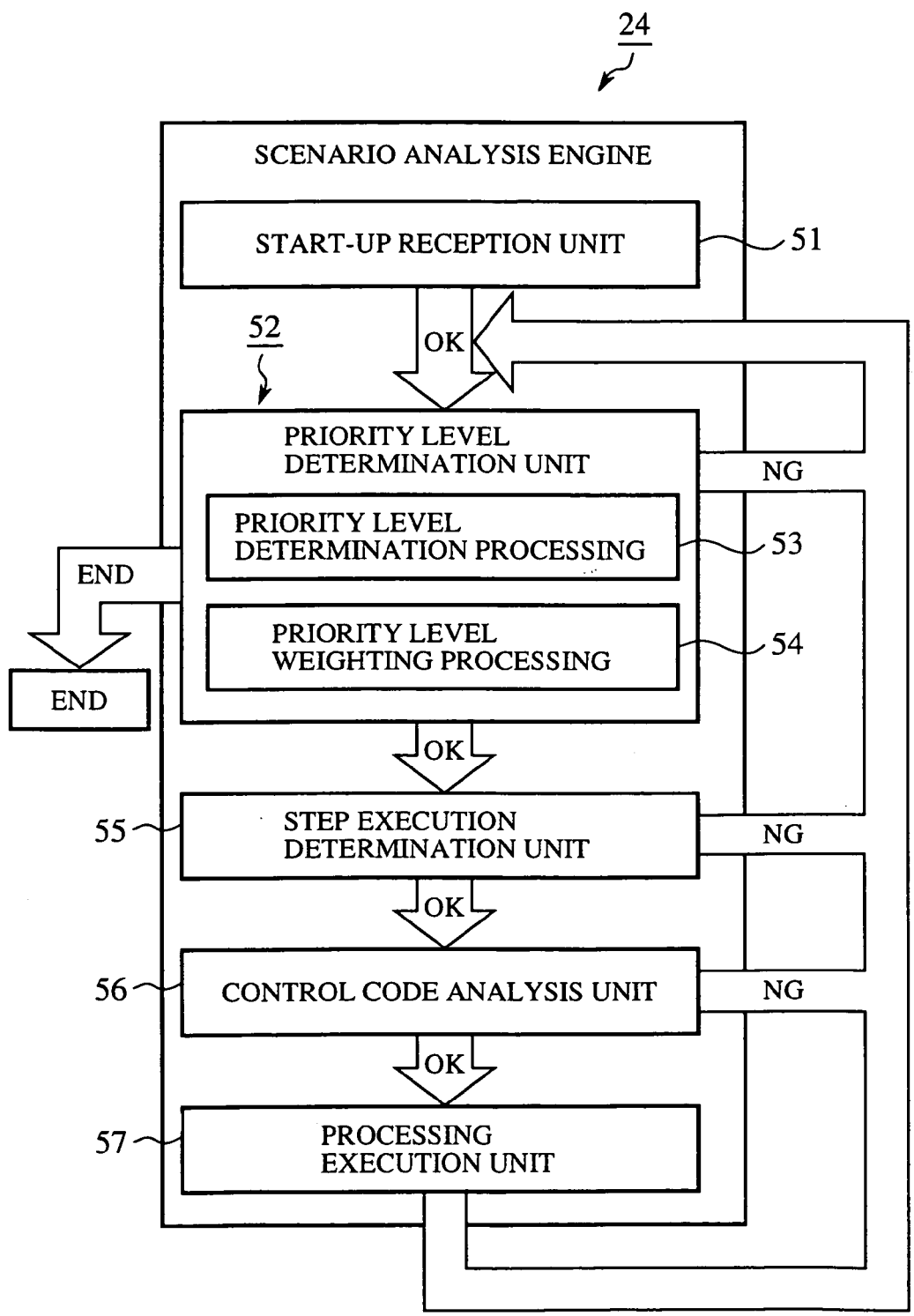
FIG. 6 is a flow chart showing processes performed by a scenario analysis engine of the scenario analysis controller.

FIG. 6 is a flow chart showing processes preformed by the scenario analysis engine according to the first embodiment. In the figure, reference numeral 51 denotes a start-up reception unit that accepts a periodic start-up from the clock 21, numeral 52 denotes a priority level determination unit for determining which priority level is assigned to each text type scenario so as to select a text type scenario 13 to be executed next, this priority level determination unit including a priority level determination processing 53 for searching through the priority level area 41 of the priority level definition table 15 shown in FIG. 4, and for retrieving the plurality of scenario numbers one by one in rotation from the scenario number area 40 in order of the priority levels corresponding to the plurality of scenario numbers, respectively, and a priority level weighting processing 54 for providing a number of steps executable by one start-up of the scenario analysis engine 24, which corresponds to the retrieved scenario number, numeral 55 denotes a step execution determination unit for determining whether or not the control code of each step to be executed is executable, and numeral 56 denotes a control code analysis unit for analyzing the control code of each step to be executed, and numeral 57 denotes a processing execution unit for performing processing based on the control code of each step to be executed.

In operation, the user describes two or more text type scenarios 13, an event definition table 14, and a priority level definition table 15 according to the description of control of an object to be controlled, in advance, and loads them into the text type scenario pack storage of the main storage unit 1 of FIG. 1, as shown in FIG. 4. It is assumed that the scenario analysis controller 12 has already been installed in the main storage 1.

Next, the operation of the scenario analysis type control system device will be described with reference to the flow chart of FIG. 6 showing the operation of the scenario analysis engine 24. The start-up reception unit 51 accepts a periodic start-up from the clock 21 shown in FIG. 3. Every time the start-up reception unit 51 receives a start-up, the scenario analysis engine 24 advances to the next step in which the priority level determination unit 52 performs processing. First, the priority level determination unit 52 searches for the highest priority level through the priority level area 41 of the priority level definition table 15 shown in FIG. 4, and retrieves one scenario number corresponding to the highest priority level stored in the priority level area from the scenario number area 40, through the priority level determination processing 53. Furthermore, the priority level determination unit 52 retrieves a number of steps executable by one start-up of the scenario analysis engine 24 and corresponding to the highest priority level from the step number area 42 through the priority level weighting processing 54. The scenario analysis engine 24 then advances to the next step in which the step execution determination unit 55 performs processing. When failing in the extraction of either a scenario number or a number of steps, the priority level determination unit 52 performs the above-mentioned processing over again in response to the next start-up. In addition, the processing is assumed to be executed and to be complete if judged that the processing ended.

After the execution of steps of the text type scenario with the highest priority level, in response to the next start-up, the priority level determination unit 52 searches for the second-highest priority level through the priority level area 41 of the priority level definition table 15, and retrieves one scenario number corresponding to the second-highest priority level stored in the priority level area from the scenario number area 40. The priority level determination unit 52 then retrieves a number of steps executable by one start-up of the scenario analysis engine 24 and corresponding to the second-highest priority level from the step number area 42. Thus, the priority level determination unit 52 can extract the plurality of scenario numbers one by one in rotation from the scenario number area 40 of the priority level definition table 15 in order of the priority levels respectively assigned to the plurality of text type scenarios 13. After retrieving one scenario number from the scenario number area 40, the priority level determination unit 52 can also extract a number of steps executable by one start-up of the scenario analysis engine 24 and corresponding to the scenario number retrieved. Furthermore, after the scenario analysis engine executes one text type scenario with the lowest priority level, the priority level determination unit 52 searches for the highest priority level through the priority level area 41 of the priority level definition table 15 again.

The step execution determination unit 55 identifies the most-recently-executed step by searching through the execution information area 44 of the scenario execution trace table 23 shown in FIG. 5 according to the scenario number retrieved by the priority level determination unit 52, and further determines which one or more steps of the text type scenario 13 to be executed should be executed next. The scenario execution trace table 23 is a blank column at the first-time execution of the text type scenario, and each column in the scenario execution trace table 23 is written by the processing execution unit 57, which will be described later. Accordingly, when the scenario execution trace table 23 is a blank column or the scenario number area 43 of the scenario execution trace table 23 does not include the scenario number retrieved by the priority level determination unit 52, it is determined that the first step of the corresponding text type scenario 13 will be executed. On the other hand, the step execution determination unit 55 refers to the exclusive key storage area 45 when the corresponding scenario number is written in the scenario number area 43 of the scenario execution trace table 23. In other words, the step execution determination unit 55 searches through part of the exclusive key storage area 45 corresponding to scenario numbers other than the corresponding scenario number so as to determine whether exclusive key information is written in the part of the exclusive key storage area 45. And, the scenario analysis engine 24 returns to the above-mentioned step in which the priority level determination unit 52 performs processing when exclusive key information is written in the part of the exclusive key storage area corresponding to scenario numbers other than the corresponding scenario number, and waits for the next start-up. Otherwise, the scenario analysis engine 24 advances to the next step in which the control code analysis unit 56 performs processing.

The control code analysis unit 56 reads one or more corresponding control codes 33 and corresponding data storage destination information 34 from the scenario data area 31 of the text type scenario 13 shown in FIG. 4 according to the execution information retrieved from the execution information area 44 of the scenario execution trace table 23 by the step execution determination unit 55 and the number of executable steps retrieved from the step number area 42 of the priority level definition table 15 by the priority level weighting processing 54. In other words, the control code analysis unit 56 reads one or more control codes 33 and one or more pieces of data storage destination information 34 only by the number of executable steps retrieved from the step number area 42 with a step next to the most-recently-executed step within the execution information area 44 as the head of these steps. After that, the processing execution unit 57 checks whether each read control code 33 is a code that can be recognized. Furthermore, when each read control code 33 uses the static data area 32, the processing execution unit 57 checks whether corresponding data handling key information 35 and data 36 are information which can be recognized. If these checking results are good, the scenario analysis engine 24 advances to the next step in which the processing execution unit 57 performs processing. In contrast, if either of the checking results is defective, the scenario analysis engine 24 returns to the above-mentioned step in which the priority level determination unit 52 performs processing and then waits for the next start-up.

The processing execution unit 57 performs processing based on each control code 33 read by the control code analysis unit 56. When label key information is stored in one control code 33 to be executed, the processing execution unit 57 uses the data 36 in the static data area 32 corresponding to the label key information during the execution of the control code. Dynamic data obtained during the execution are written into the dynamic data storage area 22 shown in FIG. 5 according to the corresponding data storage destination information 34, and can be referred to during execution based on any other control code. After that, the processing execution unit 57 searches through the scenario number area 43 of the scenario execution trace table 23 for the corresponding scenario number, and updates the corresponding execution information according to the executed number of steps so that the execution information represents the last one of the steps currently executed. Furthermore, the processing execution unit 57 writes exclusive key information in a corresponding exclusive key storage area 45 if the executed control code 33 has an exclusive demand, and deletes exclusive key information from the corresponding exclusive key storage area 45 if the executed control code 33 has an exclusive release demand. When thus completing the execution, the scenario analysis engine 24 then returns to the above-mentioned step in which the priority level determination unit 52 performs processing again in response to the next start-up, and ends the processing if determined for the processing to have ended in the priority level determination unit 52.

The use of the event definition table 14 shown in FIG. 4 will be explained in Embodiment 2.

As mentioned above, in accordance with the first embodiment, the scenario analysis type control system device can limit the number of steps of each text type scenario 13 that are executable by one start-up of the scenario analysis engine, and, after executing the limited number of steps of one text type scenario 13 with a higher priority level, shift to execution of another text type scenario 13 with a second-higher priority level. In other words, the scenario analysis type control system device can execute a plurality of text type scenarios 13 stored therein, each of which implements a specific function, in rotation by switching between them according to the priority levels assigned to them while providing a weight to each of the plurality of text type scenarios, thereby implementing pseudomultitasking. In addition, the scenario analysis type control system device can implement an online replacement without deleting data from the dynamic data storage area 22 when the scenario analysis type control system device replaces one text type scenario 13 being executed with another text type scenario 13 because the text type scenario being executed is separated from the dynamic data storage area 22 where data generated by the execution of the text type scenario is stored. Furthermore, when the executed control code has an exclusive demand, the scenario analysis type control system device can perform an exclusive process according to the exclusive demand.

Embodiment 2

Figure 7:
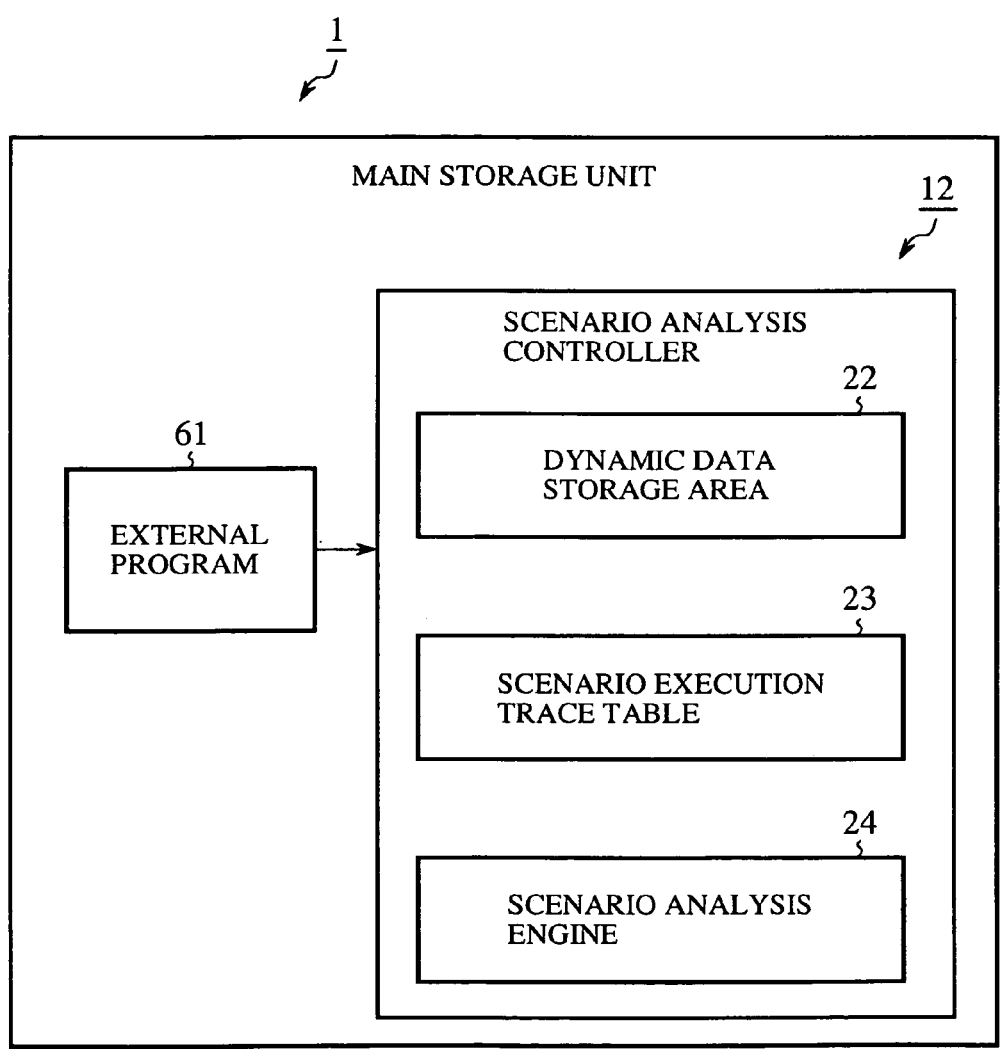
FIG. 7 is an explanatory drawing showing in detail a main storage of a scenario analysis control system device according to a second embodiment of the present invention
Figure 8:
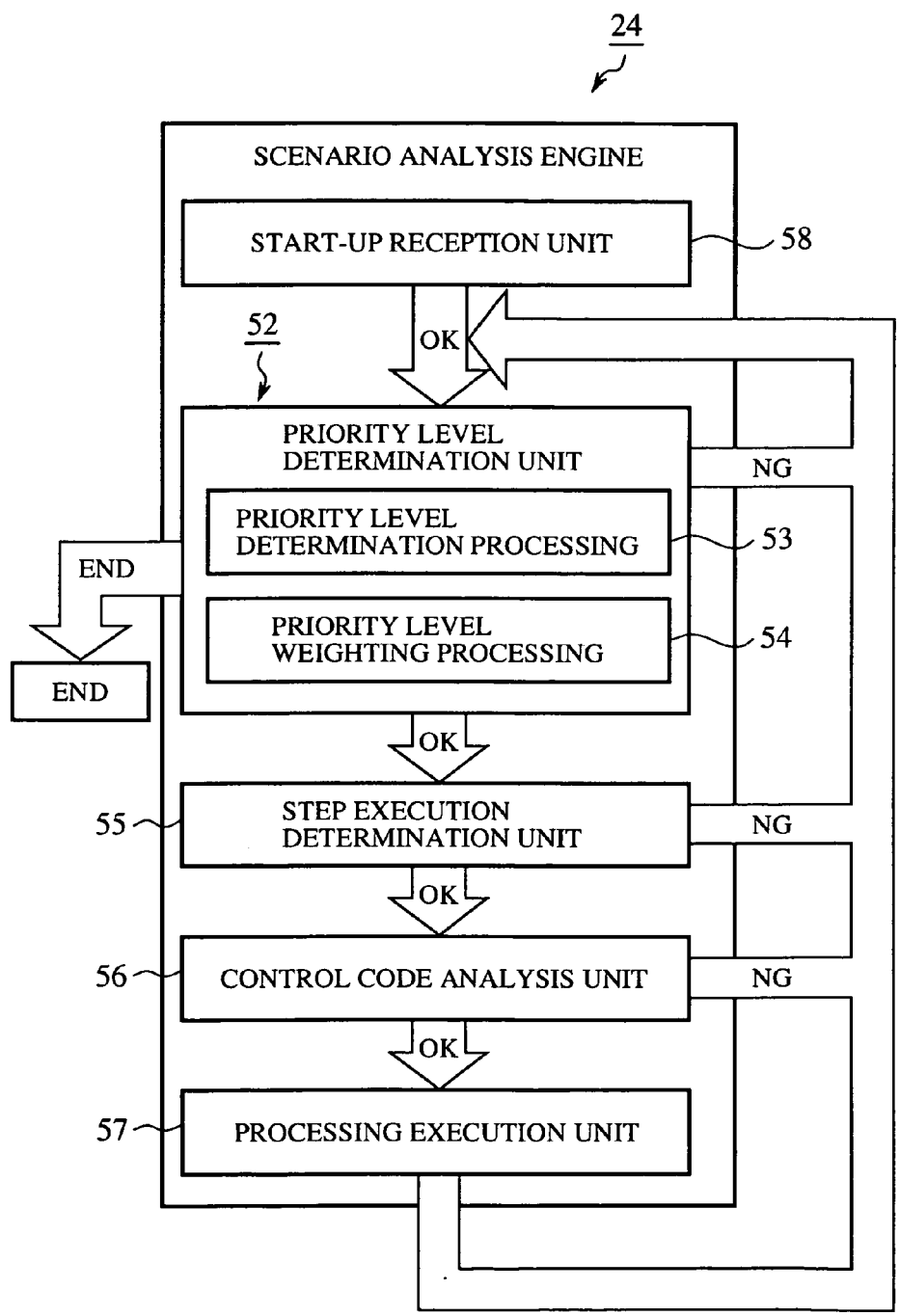
FIG. 8 is a flow chart showing processes performed by a scenario analysis engine of the scenario analysis control system device according to the second embodiment.

FIG. 7 is an explanatory drawing showing a main storage unit according to a second embodiment of the present invention in detail. In the figure, reference numeral 61 denotes an external program for performing a process of starting a scenario analysis controller 12. The external program 61 executes the process of starting the scenario analysis controller 12, adds a variety of key information to external data, and furnishes the addition result to the scenario analysis controller 12. FIG. 8 is a flow chart showing processes performed by a scenario analysis engine of the scenario analysis controller 12. In the figure, reference numeral 58 denotes a start-up reception unit that accepts a start-up from the external program 61. The main storage unit according to this embodiment has the same structure as that of the first embodiment except the components mentioned above.

In operation, the start-up reception unit 58 of FIG. 8 accepts a start-up generated by the execution of the external program 61 shown in FIG. 7. When external data and key information added to the external data are input from the external program 61 after accepting a start-up from the external program, the start-up reception unit 58 compares the key information against a list of event number data stored in an event number area 37 of an event definition table 14 shown in FIG. 4. And, when event number data that matches the key information exists in the event number area 37 of the event definition table 14, the start-up reception unit 58 retrieves corresponding processing type data from a processing type area 38 and a corresponding scenario number from an execution scenario number area 39. The processing type data is the one describing a process to be done for the external data in a code according to the corresponding event number, i.e., the key information. When the corresponding processing type data is a code describing a process of retrieving and storing the external data in a dynamic data storage area 22, the start-up reception unit 58 retrieves the external data and stores it in the dynamic storing data area 22. And, the scenario analysis engine 24 advances to the next step in which a priority level determination unit 52 performs processing.

The priority level determination unit 52 specifies one text type scenario 13 to be executed according to the scenario number extracted from the execution scenario number area 39 of the event definition table 14 by the start-up reception unit 58.

Like the first embodiment, a step execution determination unit 55 and a control code analysis unit 56 perform processing as follows. The processing execution unit 57 processes the external data that has been input from the external program 61 and stored in the dynamic storing data area 22 by executing the text type scenario 13 corresponding to the key information added to the external data.

As mentioned above, in accordance with the second embodiment, when key information and external data are input from the external program 61, the scenario analysis type control system device can process the external data according to processing type data corresponding to the key information, and execute one text type scenario 13 corresponding to the key information. The scenario analysis type control system device can thus accept any control event.

Embodiment 3

Figure 9:
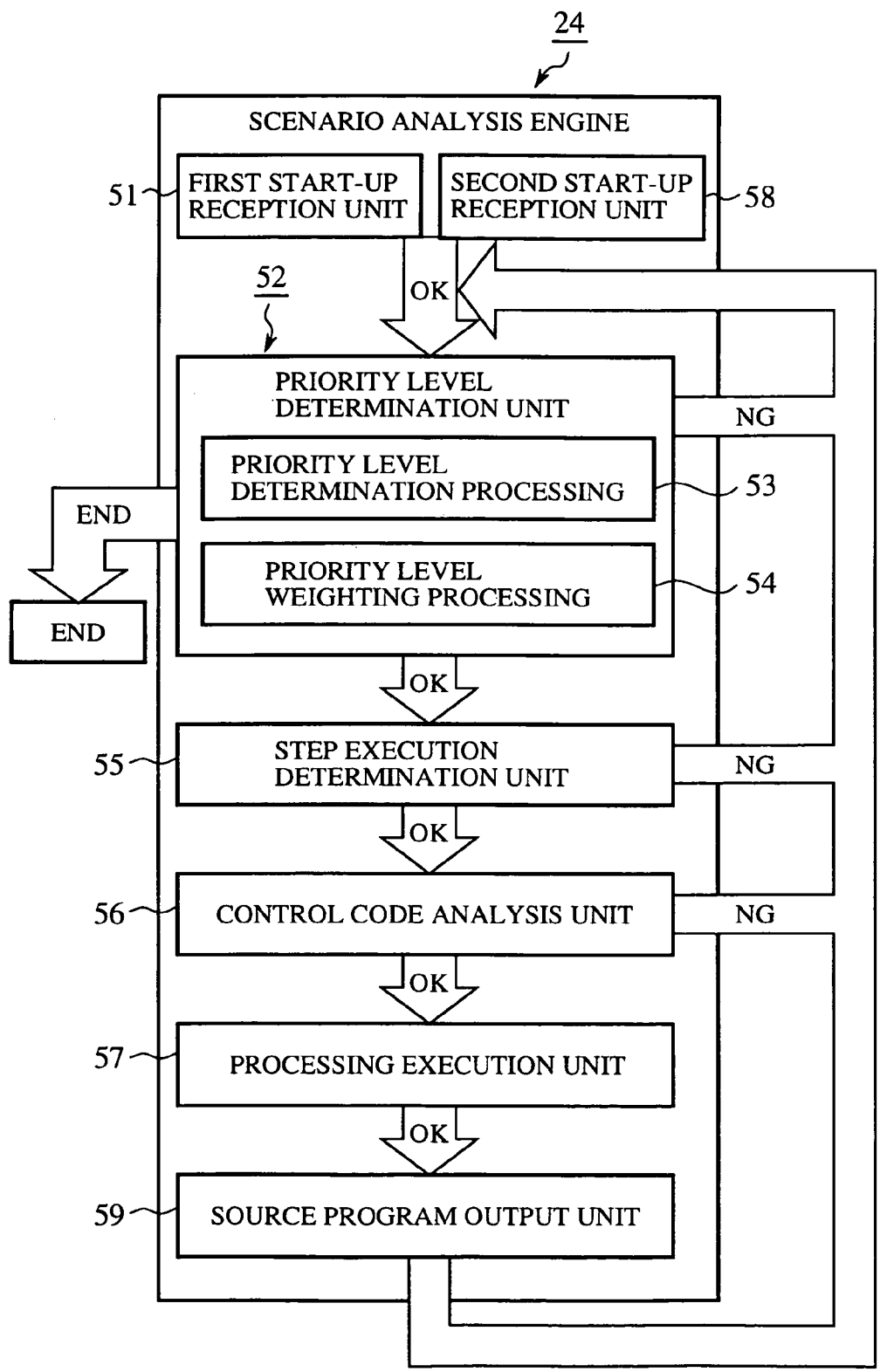
FIG. 9 is a flow chart showing processes performed by a scenario analysis engine of a scenario analysis control system device according to a third embodiment of the present invention.

FIG. 9 is a flow chart showing processes performed by a scenario analysis engine according to a third embodiment of the present invention. The scenario analysis engine according to this embodiment includes a first start-up reception unit 51 for receiving a periodic start-up from a clock of a CPU and a second start-up reception unit 58 for receiving a start-up form an external program, as shown in the figure. That is, the scenario analysis engine has both the functions of those of the first and second embodiments. In addition, reference numeral 59 denotes a source program output unit for generating a source program by retrieving and combining one text type scenario 13 executed by a processing execution unit 57, data generated by the execution of the text type scenario and stored in a dynamic data storage area 22, and corresponding data handling key information 35 and data 36 stored in a static data area 32. The scenario analysis engine according to the third embodiment includes the same structure as those of the above-mentioned first and second embodiments except the above-mentioned structure.

In operation, after executing one text type scenario 13, the scenario analysis engine 24 advances to the next step in which the source program output unit 59 performs processing. When the text type scenario 13 executed by the processing execution unit 57, data generated by the execution and stored in the dynamic storing data area 22, and the control codes 33 of the text type scenario 13 use the static data area 32, the source program output unit 59 generates a source program by retrieving and adding corresponding data handling key information 35 and data 36 to the text type scenario 13 executed and the data generated by the execution and stored in the dynamic storing data area 22.

And, the scenario analysis engine 24 sequentially stores the source program generated by the source program output unit 59 in either a main storage unit 1 or a secondary storage device 3 of FIG. 1. After that, the scenario analysis engine 24 returns to the above-mentioned step in which a priority level determination unit 52 performs processing, like the above-mentioned first and second embodiments.

As mentioned above, in accordance with the third embodiment, the scenario analysis engine 24 can generate a source program by using the source program output unit 59. According to circumstances, in consideration of the load imposed on a CPU 2 that causes the scenario analysis type control system device to operate, the scenario analysis engine 24 can switch from the execution of one text type scenario 13 which is a higher load for the CPU 2 to the execution of a generated source program which is a lower load for the CPU 2.

Embodiment 4

Figure 10:
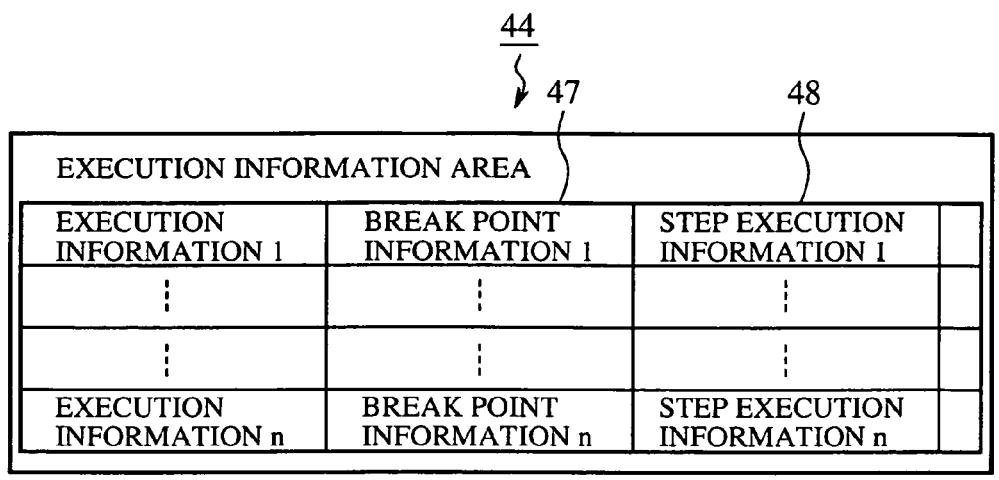
FIG. 10 is an explanatory drawing showing execution information area of a scenario execution trace table of a scenario analysis control system device according to a fourth embodiment of the present invention in detail.
Figure 11:
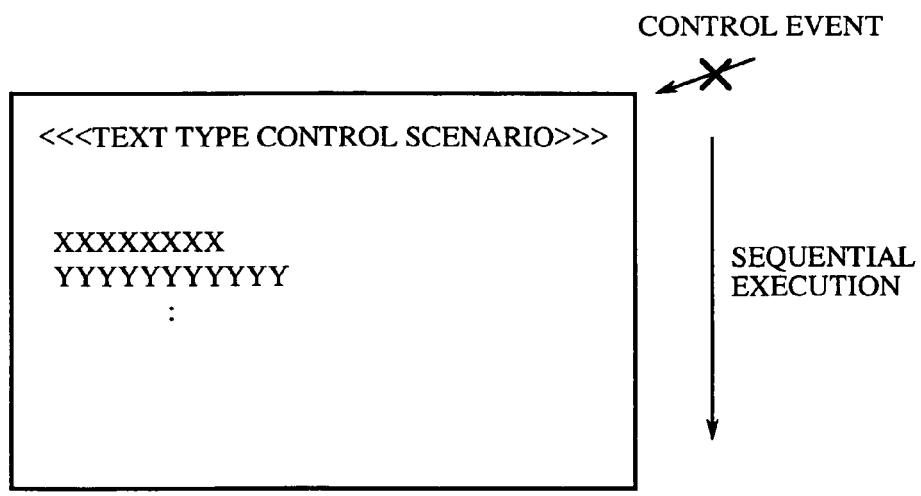
FIG. 11 is an explanatory drawing for showing a prior art text control scenario.

FIG. 10 is an explanatory drawing showing in detail an execution information area 44 of a scenario execution trace table 23 according to a fourth embodiment of the present invention. In the figure, reference numeral 47 denotes a break point information area for storing break point information used for instructing a scenario analysis engine to interrupt execution, and numeral 48 denotes a step execution information area for storing step execution information used for instructing the scenario analysis engine to execute step by step one text type scenario regardless of the priority level assigned to the scenario. The scenario execution trace table 23 according to this embodiment has the same structure as that the third embodiment with the except that it further includes the break point information and the step execution information.

In operation, when debugging one text type scenario 13, the user describes either one or more break points where execution is to be interrupted or a step execution instruction for instructing the scenario analysis engine to execute the text type scenario step by step regardless of the priority level assigned to it within an arbitrary control code 33 of the text type scenario 13.

In FIG. 9, when a processing execution unit 57 executes the control code 33 of one break point and the step execution instruction, the processing execution unit 57 writes the information as either break point information or step execution information in the corresponding area 47 or 48 of the scenario execution trace table 23 shown in FIG. 10, and continues the processing.

Next, the scenario analysis engine 24 advances to the next step in which a step execution determination unit 55 performs processing after processing a priority level determination unit 52, and searches the break point information area 47 and the step execution information area 48 within the scenario execution trace table 23 with the step execution determination unit 55. When break point information is written in the break point information area 47 of the scenario execution trace table 23, the scenario analysis engine 24 interrupts the execution of the text type scenario without advancing to the next step in which a control code analysis unit 56 performs processing, and then returns to the above-mentioned step in which the priority level determination unit 52 performs processing. After that, the scenario analysis engine 24 keeps interrupting the execution of the text type scenario 13 while the break point information is being written in the scenario execution trace table 23. When a break point release demand is input from outside the system by the user, the scenario analysis engine 24 deletes the written break point information, and restarts the execution of the text type scenario.

On the other hand, when step execution information is written in the step execution information 48 of the scenario execution trace table 23, the scenario analysis engine 24 executes the text type scenario 13 step by step regardless of the priority level assigned to it according to a corresponding step execution demand input from outside the system by the user. When a step execution release demand is then input from outside the system by the user, the scenario analysis engine 24 deletes the written step execution information, and releases the step execution.

As mentioned above, in accordance with the fourth embodiment of the present invention, the scenario analysis engine 24 can interrupt the execution of each text type scenario 13 at one or more arbitrary break points, and execute each text type scenario 13 step by step, thereby debugging each text type scenario 13 easily.

Many widely different embodiments of the present invention may be constructed without departing from the spirit and scope of the present invention. It should be understood that the present invention is not limited to the specific embodiments described in the specification, except as defined in the appended claims.

What is claimed is:

1. A scenario analysis control system device comprising:
   start-up reception means for accepting a periodic start-up;
   scenario storage means for storing at least two text scenarios, each text scenario implementing a specific function and being comprised of control codes;
   priority level definition storage means for storing, for each of the at least two text scenarios stored in said scenario storage means, a priority level and a quantity, representing the number of steps executable in response to a single start-up; and
   scenario analysis processing means for, every time said start-up reception means accepts a start-up, determining which text scenario is to be executed next and which steps of a text scenario selected are to be executed according to priority levels stored in said priority level definition storage means, and for reading the steps to be executed from said scenario storage means and executing the steps to be executed.

2. The scenario analysis control system device according to claim 1, wherein said scenario analysis processing means generates a source program based on the text scenario executed and data generated by execution of the text scenario.

3. The scenario analysis control system device according to claim 1, further comprising scenario execution trace storage means for storing exclusive execution information for prohibiting execution of any other steps for each of the at least two text scenarios stored in said scenario storage means, wherein said scenario analysis processing means updates corresponding exclusive execution information stored in said scenario execution trace storage means according to one of an exclusive demand and an exclusive release demand included in a control code executed by the text scenario, and prohibits execution of any other steps when the corresponding exclusive execution information indicates an input of an exclusive demand.

4. The scenario analysis control system device according to claim 1, further comprising scenario execution trace storage means for storing at least one break point for interrupting execution of a corresponding text scenario for each of the at least two text scenarios stored in said scenario storage means, wherein, when at least one break point is included in a control code executed by the text scenario or when receiving a break point release demand, said scenario analysis processing means writes the at least one break point into said scenario execution trace storage means or deletes all existing break points for the text scenario from said scenario execution trace storage means, and interrupts the execution of the text scenario while the at least one break point is being written in said scenario execution trace storage means.

5. The scenario analysis control system device according to claim 1, further comprising scenario execution trace storage means for storing step execution information for instructing said scenario analysis processing means to execute a corresponding text scenario, step-by-step, for each of the at least two text scenarios stored in said scenario storage means, wherein, when a step execution instruction is included in a control code executed by the text scenario or when receiving a step execution release demand, said scenario analysis processing means updates corresponding step execution information stored in said scenario execution trace storage means, and executes the text scenario, step-by-step, while the corresponding step execution information indicates an input of the step execution instruction.

6. The scenario analysis control system device according to claim 1, wherein said scenario analysis processing means executes a limited number of the steps to be executed, stops executing the steps of a first text scenario selected after the limited number is reached, selects a second text scenario of lower priority than the first text scenario selected, and executes a set of steps of the second text scenario.

7. The scenario analysis control system device according to claim 1, wherein the number of steps executable in response to a single start-up is the number of steps required to complete processing of the at least one text scenario.

8. A scenario analysis control system device comprising:
   start-up reception means for accepting a start-up from an external program;
   scenario storage means for storing at least two text scenarios, each text scenario implementing a specific function and being comprised of control codes;
   priority level definition storage means for storing, for each of the at least two text scenarios stored in said scenario storage means, a priority level and a quantity, representing the number of steps executable in response to a single start-up from said external program;
   event information storage means for storing, for each of at least two event identifiers, processing information indicating processing to be performed on external data and scenario identification information indicating one text scenario that is to be executed and is stored in said scenario storage means; and
   scenario analysis processing means
      for, every time said external program start-up reception means accepts a start-up from the external program, determining which text scenario is to be executed next and which steps of a text scenario selected are to be executed from the external program according to priority levels stored in said priority level definition storage means,
      for reading the steps to be executed from said scenario storage means and executing the steps to be executed,
      for, when an event identifier and external data are input from the external program, retrieving processing information and scenario identification information corresponding to the event identifier from said event definition storage means, for processing the external data according to the processing information, and for reading one text scenario to be executed from said scenario storage means according to the scenario identification information, and executing the text scenario.

9. The scenario analysis control system device according to claim 8, wherein said scenario analysis processing means generates a source program based on the text scenario executed and data generated by execution of the text scenario.

10. The scenario analysis control system device according to claim 8, further comprising scenario execution trace storage means for storing exclusive execution information for prohibiting execution of any other steps for each of the at least two text scenarios stored in said scenario storage means, wherein said scenario analysis processing means updates corresponding exclusive execution information stored in said scenario execution trace storage means according to one of an exclusive demand and an exclusive release demand included in a control code executed by the text scenario, and prohibits execution of any other steps when the corresponding exclusive execution information indicates an input of an exclusive demand.

11. The scenario analysis control system device according to claim 8, further comprising scenario execution trace storage means for storing at least one break point for interrupting execution of a corresponding text scenario for each of the at least two text scenarios stored in said scenario storage means, wherein, when at least one break point is included in a control code executed by the text scenario or when receiving a break point release demand, said scenario analysis processing means writes the at least one break point into said scenario execution trace storage means or deletes all existing break points for the text scenario from said scenario execution trace storage means, and interrupts the execution of the text scenario while the at least one break point is being written in said scenario execution trace storage means.

12. The scenario analysis control system device according to claim 8, further comprising scenario execution trace storage means for storing step execution information for instructing said scenario analysis processing means to execute a corresponding text scenario, step-by-step, for each of the at least two text scenarios stored in said scenario storage means, wherein, when a step execution instruction is included in a control code executed by the text scenario or when receiving a step execution release demand, said scenario analysis processing means updates corresponding step execution information stored in said scenario execution trace storage means, and executes the text scenario, step-by-step, while the corresponding step execution information indicates an input of the step execution instruction.

13. The scenario analysis control system device according to claim 8, wherein said scenario analysis processing means executes a limited number of the steps to be executed, stops executing the steps of a first text scenario selected after the limited number is reached, selects a second text scenario of lower priority than the first text scenario selected, and executes a set of steps of the second text scenario.

14. The scenario analysis control system device according to claim 8, wherein the number of steps executable in response to a single start-up is the number of steps required to complete processing of the at least one text scenario.

* * * * *